(12) United States Patent
Wojcik et al.

(10) Patent No.: US 9,113,321 B1
(45) Date of Patent: Aug. 18, 2015

(54) PUBLIC SAFETY COMMUNICATIONS INCIDENT RESPONSE

(75) Inventors: Mark P. Wojcik, Metuchen, NJ (US); Jay Hsu, Green Brook, NJ (US)

(73) Assignee: Cellco Partnership, Basking Ridge, NJ (US)

(*) Notice: Subject to any disclaimer, the term of this patent is extended or adjusted under 35 U.S.C. 154(b) by 771 days.

(21) Appl. No.: 12/761,878

(22) Filed: Apr. 16, 2010

(51) Int. Cl.
*H04W 4/22* (2009.01)
*H04W 4/14* (2009.01)

(52) U.S. Cl.
CPC . *H04W 4/22* (2013.01); *H04W 4/14* (2013.01)

(58) Field of Classification Search
CPC .......... H04W 4/22; H04W 4/02; H04W 4/06; H04W 4/12; H04W 4/14; H04W 24/02; H04W 76/0007
USPC ............. 455/404.1, 414.1, 445, 456.1–456.6, 455/561
See application file for complete search history.

(56) References Cited

U.S. PATENT DOCUMENTS

| | | | |
|---|---|---|---|
| 8,036,720 B1 * | 10/2011 | Conrad et al. ................. | 455/574 |
| 8,463,251 B2 * | 6/2013 | Patterson et al. ............ | 455/415 |
| 8,688,078 B2 * | 4/2014 | Cook et al. ..................... | 455/411 |
| 9,002,343 B2 * | 4/2015 | Harrigan ....................... | 455/419 |
| 2002/0107032 A1 * | 8/2002 | Agness et al. ................. | 455/456 |
| 2004/0203667 A1 * | 10/2004 | Schroeder et al. .......... | 455/414.1 |
| 2005/0287979 A1 * | 12/2005 | Rollender .................... | 455/404.1 |
| 2007/0021097 A1 * | 1/2007 | Gaeta et al. ................. | 455/404.1 |
| 2007/0022481 A1 * | 1/2007 | Goldman et al. ............... | 726/26 |
| 2007/0036322 A1 * | 2/2007 | Goldman et al. ......... | 379/211.02 |
| 2007/0238454 A1 * | 10/2007 | Chambers ................... | 455/422.1 |
| 2009/0131060 A1 * | 5/2009 | Silver ............................ | 455/445 |
| 2010/0048160 A1 * | 2/2010 | Lekutai ...................... | 455/404.1 |
| 2010/0210248 A1 * | 8/2010 | Morrissey et al. .......... | 455/414.1 |
| 2010/0227581 A1 * | 9/2010 | Cook et al. ................. | 455/404.1 |
| 2012/0028598 A1 * | 2/2012 | Bakker et al. ............. | 455/404.1 |

* cited by examiner

*Primary Examiner* — Khawar Iqbal

(57) ABSTRACT

A system and method permit communications of a mobile station of emergency service personnel while blocking communications of mobile stations of other users. In response to an emergency in a region, a mobile switching center may be configured to restrict communications of mobile stations in the region through an identified cell site base station controlled by the mobile switching center during the emergency while the identified cell site base station continues wireless radio frequency transmissions. This configuration may be accomplished with the use of a trigger, such as a Specific_Called_Party_Digit_String trigger. While the mobile switching center is configured for the emergency, a designated trigger condition may be detected with respect to an attempted communication for a mobile station through the identified cell site base station.

14 Claims, 4 Drawing Sheets

PUBLIC SAFETY COMMUNICATIONS INCIDENT RESPONSE

TECHNICAL FIELD

The present subject matter relates to technologies for shutting down all communication through a relatively limited portion of a public wireless mobile communication network, for all customers except for a selected category of customers, such as emergency preparedness personnel.

BACKGROUND

A typical wireless mobile communication network is made of a number of cells, each of which includes at least one fixed-location transceiver known as a cell site or base station. The base station within each cell provides radio coverage for a variable number of mobile communication devices located within the geographic service area the cell. Radio coverage for base stations in nearby cells may overlap so that a mobile communication device in any one cell can communicate through and transition into other cells as the user roams, including handoff during an ongoing communication. The base station is continuously broadcasting radio frequency signals in the cell to identify itself and receive signals from the mobile communications devices that are located within that cell. The base station communicates with the wireless mobile communication devices within the cell by receiving and transmitting RF signals. When a call is made from the mobile communications device, the call attempt signaling is transmitted by the mobile communication device to the base station with the strongest RF signal (typically the closest physical base station). The selected base station receives and initially processes the call.

In recent years, wireless mobile communications devices have increasingly been used by criminal and terrorist organizations during the commission of a crime or attack. For example, during a three-day terrorist attack that struck several locations in Mumbai, India during late 2008, the attackers used mobile communications devices to coordinate the attack, monitor international reaction to the attacks, and keep abreast of police and military efforts to end the attack. The attackers also used mobile communication devices to order the killing of hostages and to adjust other tactics while the attacks were underway.

Currently, there is a process between the National Communication Service (NCS) and wireless mobile communication network carriers, such as Verizon Wireless, to prevent mobile communication in an affected area. This process defines a procedure for shutting down mobile communications in a given number of cells within the affected area (i.e., affected cells) by shutting off all transmit amplifiers within the base stations in each cell so as to stop transmission of RF signal from the base station in the affected cell. However, given the nature of RF propagation, once a base station shuts down, the RF from base stations in the surrounding cells fills the affected cell. Although the performance may not be the same in the affected cell, the RF from the surrounding areas often would be sufficient for communications use.

Due to the nature of RF propagation, the current form of shutting down mobile communications in a given cell requires an excessively large number of base stations be shut down. This includes shutting down the base stations in the affected cells and also shutting down base stations in surrounding cells that would propagate RF into the affected cells. As an example, in the case of New York City, in order to shut down mobile communications in Mid-town Manhattan, it would be necessary to shut down base stations in all cells located in Mid-town Manhattan (i.e., the affected cells) and also shut down all base stations in cells in New York City's other four boroughs—Bronx, Brooklyn, Queens, and Staten Island—and in New Jersey several miles west of the Hudson River (i.e., the surrounding cells). By shutting down the mobile communications in both the affected and surrounding cells, the general public located in the surrounding cells is prevented from communicating on the mobile communications network. This resulting shut down of mobile communications in the surrounding cells leads to a loss of revenue in both the affected and surrounding cells, thereby complicating the decision to shut down the mobile communications network.

The current method also does not allow emergency service personnel in the affected and surrounding cells to communicate on the wireless mobile communication network. Such emergency service personnel include, for example, E911 personnel, Wireless Priority Service ("WPS") personnel, or public safety personnel Further, because all mobile communications are shut down in the affected and surrounding cells, the general public is unable to communicate on the mobile communication network with emergency service agencies (such as E911) or emergency service personnel.

Hence a need exists for more effective techniques to selectively prevent mobile communication in affected cells without preventing mobile communications in cells surrounding the affected cells.

SUMMARY

The teachings herein alleviate one or more of the above noted problems. The exemplary solution described in detail and shown in the drawings allows the network operator to shut down communications in a limited geographical area while still allowing emergency service personnel, such as E911 personnel, Wireless Priority Service ("WPS") personnel, or public safety personnel, in the affected geographical area to communicate on the wireless mobile communication network. In addition, the method allows the general public to communicate over the mobile communications network with emergency service agencies (such as E911) or emergency service personnel, even through the affected cells.

A more specific example permits communications of a mobile station of emergency service personnel while blocking communications of mobile stations of other users. In response to an emergency in a region, a switch may be configured to restrict communications of mobile stations in the region through an identified cell site base station controlled by the switch during the emergency while the identified cell site base station continues wireless radio frequency transmissions. This configuration may be accomplished for example with the use of a trigger, such as a Specific_Called_Party_Digit_String trigger. While the switch is configured for the emergency, a designated trigger condition may be detected with respect to an attempted communication for a mobile station through the identified cell site base station. The switch may be a mobile switching center.

Based on the detected designated trigger condition, it may be determined that the attempted communication is an emergency communication and the attempted communication may be completed through the identified cell site base station. The attempted communication may be determined to be an emergency communication because it originates from a mobile station of emergency service personnel or because it is directed to a public safety entity. The trigger condition may be detected when an appropriate sequence of digits is detected by the switch or a service control point.

The method may also include a step of while the switch is configured for the emergency, blocking communication attempts for non-emergency communications from other mobile stations through the identified cell site base station for which the designated trigger condition is not detected.

The detailed disclosure also describes an example of a system for permitting communications of a mobile station of emergency service personnel while blocking communications of mobile stations of other users. The system includes a switch for restricting communications of mobile stations through an identified cell site base station controlled by the switch while the identified cell site base station continues wireless radio frequency transmission. The mobile switching center may be configured to detect a designated trigger condition with respect to an attempted communication for a mobile station through the identified cell site base station; and based on the detected designated trigger condition, obtain a determination that the attempted communication is an emergency communication. In response, the switching center will complete the attempted communication through the identified cell site base station. However, the switch is also configured to block communication attempts for non-emergency communications from other mobile stations through the identified cell site base station for which the designated trigger condition is not detected.

In detecting whether the attempted communication is an emergency communication, the system may determine that the attempted communication is an emergency communication because it originates from a mobile station of emergency service personnel or is directed to a public safety entity. The system may also be configured such that the designated trigger condition is detected when an appropriate sequence of digits is detected by the switch or a service control point. The switch may also be configured to restrict communications of mobile stations in the region based on a trigger, such as a Specific_Called_Party_Digit_String trigger.

The system may also include a service control point coupled to the switch, the service control point configured to determine whether the trigger condition is satisfied. Further, the system may include a base station coupled to the switch, the base station configured to complete an attempted communication if the trigger condition is detected.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various technologies disclosed herein relate to more effective techniques for selectively preventing mobile communication in an affected area without preventing mobile communications in areas that surround the affected area.

Figure 1:
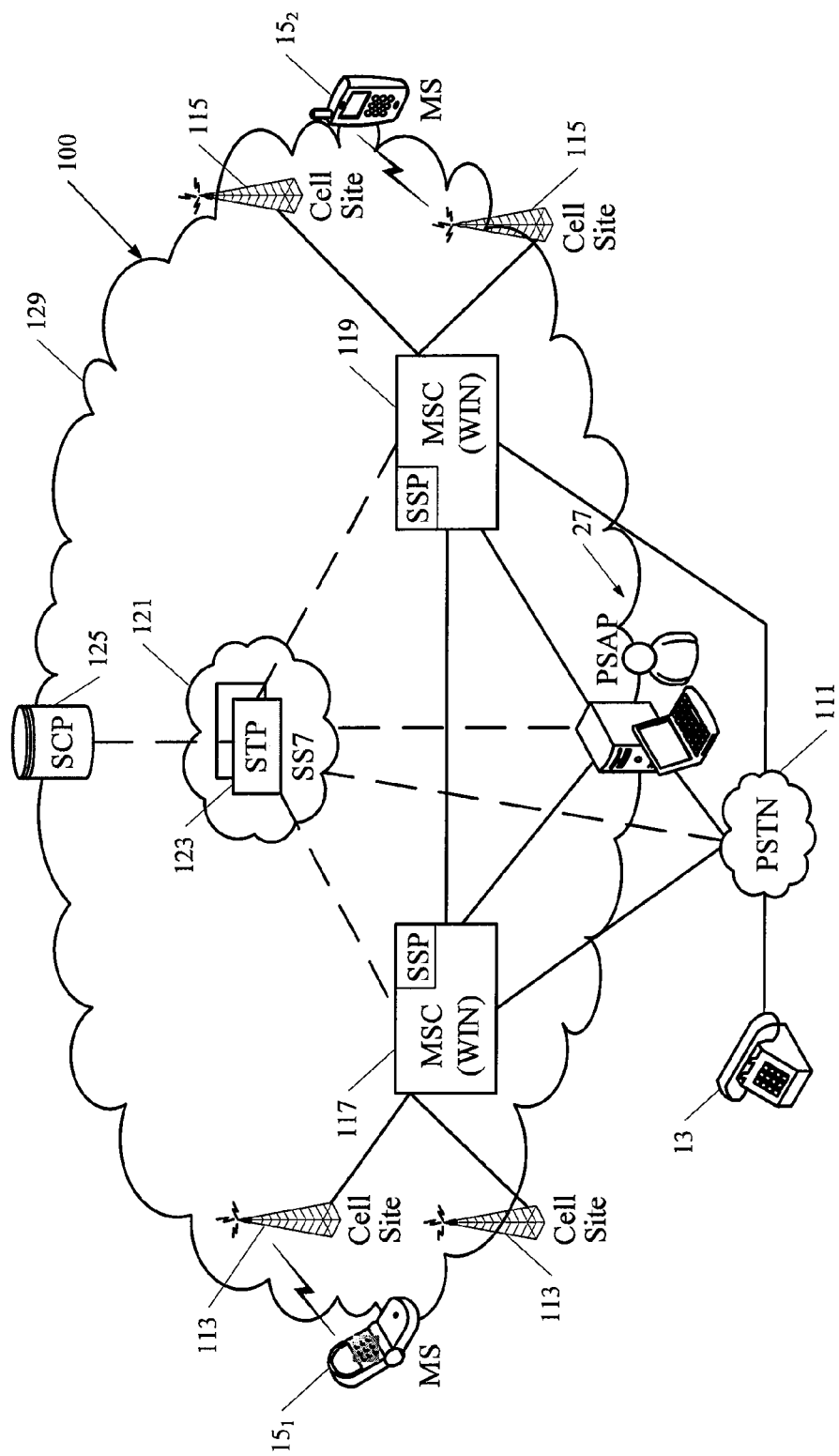
FIG. 1 illustrates a high-level diagram of an example of a mobile wireless communication network.

Reference now is made in detail to the examples illustrated in the accompanying drawings and discussed below. FIG. 1 illustrates a diagram of a mobile wireless communication network 100. The communication network 100 provides mobile voice telephone communications, and today would typically also offer a variety of packet data services, for numerous mobile stations. For purposes of later discussion, two mobile stations 15 appear in the drawing ($15_1$ and $15_2$); each operated by a different user. The stations 15 represent the general class of mobile stations that operate via a public cellular network or the like.

The network 100 enables users of the mobile stations 15 to initiate and receive telephone calls to each other as well as through the public switched telephone network (PSTN) 111, for example for communications with landline telephone devices such as telephone station 13. The network may also enable users of the mobile stations 15 to initiate and receive various data communications, for example through a WAN, to the public data network referred to as the Internet (not shown).

The mobile stations 15 may take many forms. For example, some mobile stations may take the form of portable handsets, although they may be implemented in other form factors. Other mobile stations may comprise portable digital assistants (PDAs) with built-in wireless communication capabilities and possibly a voice interface. As another alternative, a wireless device such as network interface card or even a mobile telephone having data communication capabilities may be connected to or integrated into a portable computing device, such as a handheld or laptop type computer.

In the example illustrated in FIG. 1, the mobile wireless communication network 100 is a cellular type network. Physical elements of a radio access network (RAN) portion thereof include a number of base stations (generally referred to as 113). For the purposes of discussion, FIG. 1 shows two sets of base stations $113_a$ and $113_b$, but it is understood the a number of base stations 113 are used in the network 100. Each base station 113 typically includes a base transceiver system (BTS) not separately shown, which communicates via antennae and the air-link with the mobile stations 15, when within range. The base station radio tower is located within a coverage area often referred to as a "cell."

Figure 2:
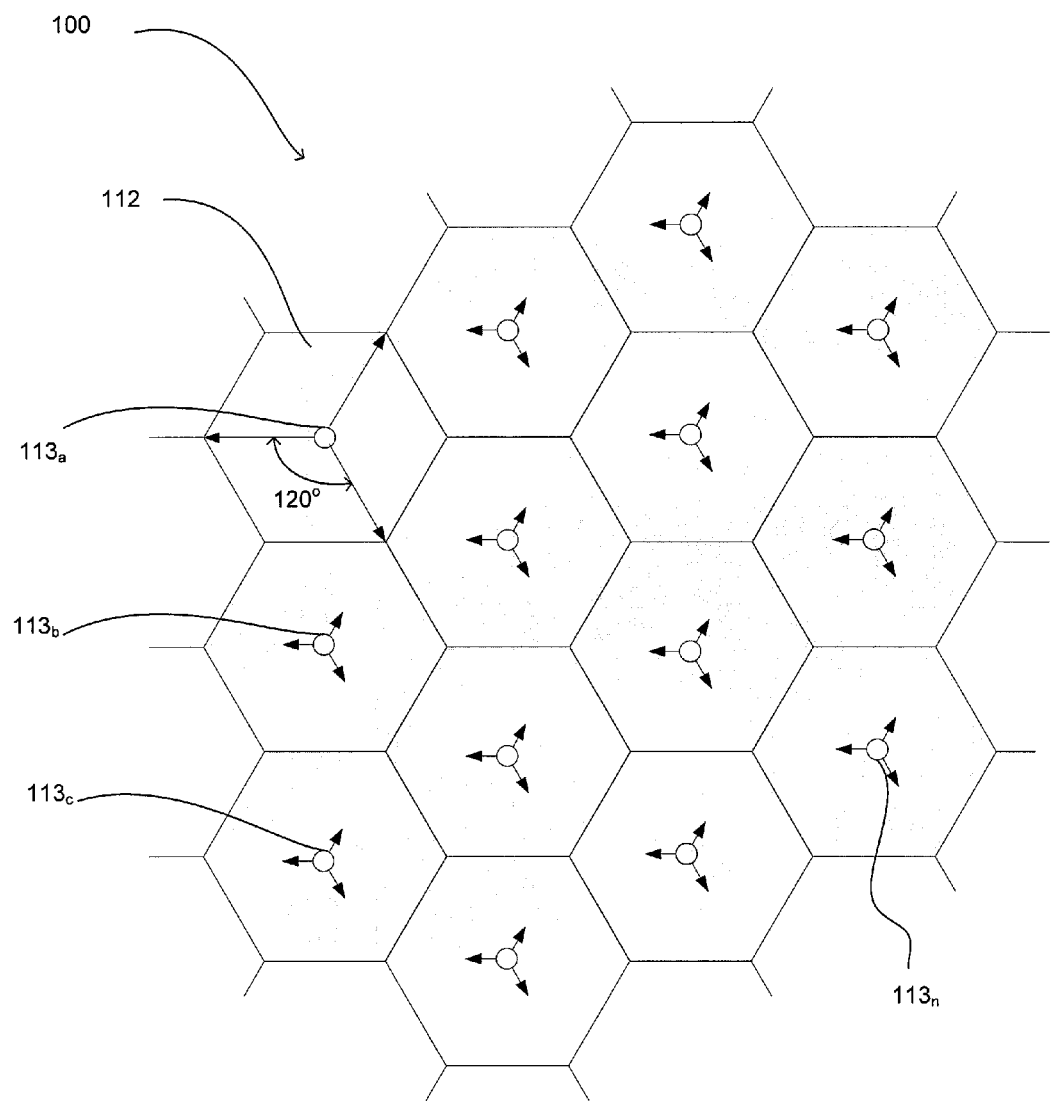
FIG. 2 illustrates an example of a cell layout for the mobile wireless communication network.

FIG. 2 illustrates a cell layout for the mobile wireless communication network. The mobile wireless communication network 100 includes a plurality of cells 112. Each cell includes at least one base station $113_a$-$113_n$, (generally referred to herein as 113) which may be located near the center of the cell 112. The base station 113 typically acts as the access point to the network for mobile stations 15 located within the cell 112 serviced by the base station 113. The base station 113 typically includes three BTSs (not separately shown) that are responsible for carrying out radio communications between the network 100 and any mobile station 15 operating within the area of the cell. Each of the three BTSs may also be responsible for speech encoding, encryption, multiplexing, modulation/demodulation of the radio signals, and frequency hopping. The BTS at a base station 113 may also assign and reassign channels to the mobile stations 15 that it serves and monitors the signal levels to recommend hand-offs to other base stations 113 as the mobile station moves from one cell 112 to another. Each BTS usually covers a single 120° sector of a cell 112, as illustrated by base station $113_a$ in FIG. 2. As a result, a base station 113 with three BTSs is able to accommodate all 360° around the base station 113. However, it is understood that that depending on various factors, such as geography or user demand in a cell 112, the cell 112 may be divided into one or two or more sectors (i.e., one or two or more BTSs), or a cell may be serviced with more than three BTSs with redundant sector coverage.

Although shown as having clearly defined boundaries in FIG. 2, RF signal propagation to/from the base stations may extend beyond the boundaries so that the actual coverage and service area of any one cell often overlaps with the area of one or more of the adjacent or surrounding cells.

Returning to FIG. 1, a typical network 100 also includes a number of radio access network switches. The drawing shows two such switches 117 and 119 by way of example. In a circuit switched implementation, the switches may be mobile switching centers ("MSC") 117, 119 that support both cellular voice and packet data services. Each MSC switch 117 or 119 connects through trunk circuits to a number of the BTS transceivers located at each of the base stations 113, which the respective MSC switch 117 or 119 serves and controls. Of course, those skilled in the art will recognize that packet switching or other technologies could be used to implement the switch, in place of the older circuit switched technology.

The network typically includes a base station controller (BSC) functionality that controls the functions of a number of base stations and helps to manage how calls made by each mobile station are transferred (or handed-off) from one serving base station to another. Each wireless network equipment vender implements this function differently. Some vendors have a physical entity, which they call a BSC, while other vendors include this functionality as part of their MSC switch.

The illustrated network may use an intelligent network approach to call processing. In the example, each MSC type switch 117 or 119 is configured to detect trigger events in call processing and communicate with an appropriate control point to obtain further directions or additional information needed to process individual calls. Hence, each MSC switch is configured as a service switching point (SSP) for wireless intelligent network (WIN) call processing purposes.

Actual customer communication traffic is carried between MSC switches 117, 119 and/or to and from the PSTN 111 via links referred to as "bearer" channels, typically over interoffice trunk circuits. Modern networks of the type generally illustrated in FIG. 1 also include an out-of-band signaling network for carrying a variety of different signaling communications relating to the customer traffic and network health. In the example, the signaling network is implemented as a signaling system 7 (SS7) type network. A SS7 network 121 comprises a number of signaling transfer points (STPs) 123, typically implemented as redundant mated pairs, and links to other nodes or elements that communicate via the SS7 network 121. In the drawing, signaling links via the SS7 network are represented by dotted lines. In the example, the MSCs 117 and 119 have links to the STPs 123 of the SS7 network 121. The SS7 network 121 also has links to signaling elements of the PSTN 111. A public safety answering point (PSAP) 27 may also have a link to an STP 123 of the SS7 network 121.

The carrier operating the wireless network 100 also operates a home location register (HLR) that stores subscriber profiles and related call processing control information for each of that carrier's wireless subscribers and their associated mobile stations 15. The HLR may reside in the home MSC, however, in the example, the HLR resides in a centralized node sometimes referred to as a service control point (SCP) 125. The SCP 125 communicates with the MSCs 117 via data links and one or more of the signaling transfer points (STPs) 123 of the SS7 network 121. As recognized in the art, the HLR stores for each mobile subscriber the subscriber's mobile telephone number, the mobile identification number, information as to the current point of attachment of the mobile station to the network (e.g. identification of the serving MSC) and information specifying the wireless services subscribed to by the mobile subscriber, such as numeric call block services, multiple alerting, etc.

For many of the features applied to calls through the network, the same or a different SCP 125 also provides the call processing logic. When a trigger causes a WIN capable SSP type MSC to launch a query regarding a customer service or feature, the SCP 125 accesses the appropriate call processing record (CPR) in its subscriber database and responds with an instruction to the SCP as to how to further process the call.

Hence, in the example of FIG. 1, the WIN type MSC switches 117, 119 provide the switching fabric, although they may implement at least some call processing logic. The MSCs for example may implement some lower layer call processing logic. However, higher layer call processing logic, for advanced services or features, is typically implemented at the SCP 125. For example, logic for service features that restrict incoming calls to mobile stations 15 is implemented by CPRs and associated programming in the SCP 125. Suspending or modifying such restrictions involves notifying the SCP 125 of 911 or other emergency calls. As will be discussed more later, one exemplary technique to suspend or modify call processing restrictions might be to selectively limit calls in response to an incident of emergency in a selected area to only those calls made by emergency service personnel or calls made to emergency service agencies such as 911 calls to the PSAP 27.

Wireless carriers often take advantage of the flexibility offered by intelligent call processing techniques such as intelligent network triggers (e.g., WIN triggers or CAMEL triggers) to build subscriber services using service logic housed in SCPs external to the carrier's MSCs. The example of FIG. 1 assumes use of WIN triggers, for discussion purposes. Some of these services based on intelligent network type call processing and control place limits on the subscriber's ability to send or receive voice calls.

Figure 3:
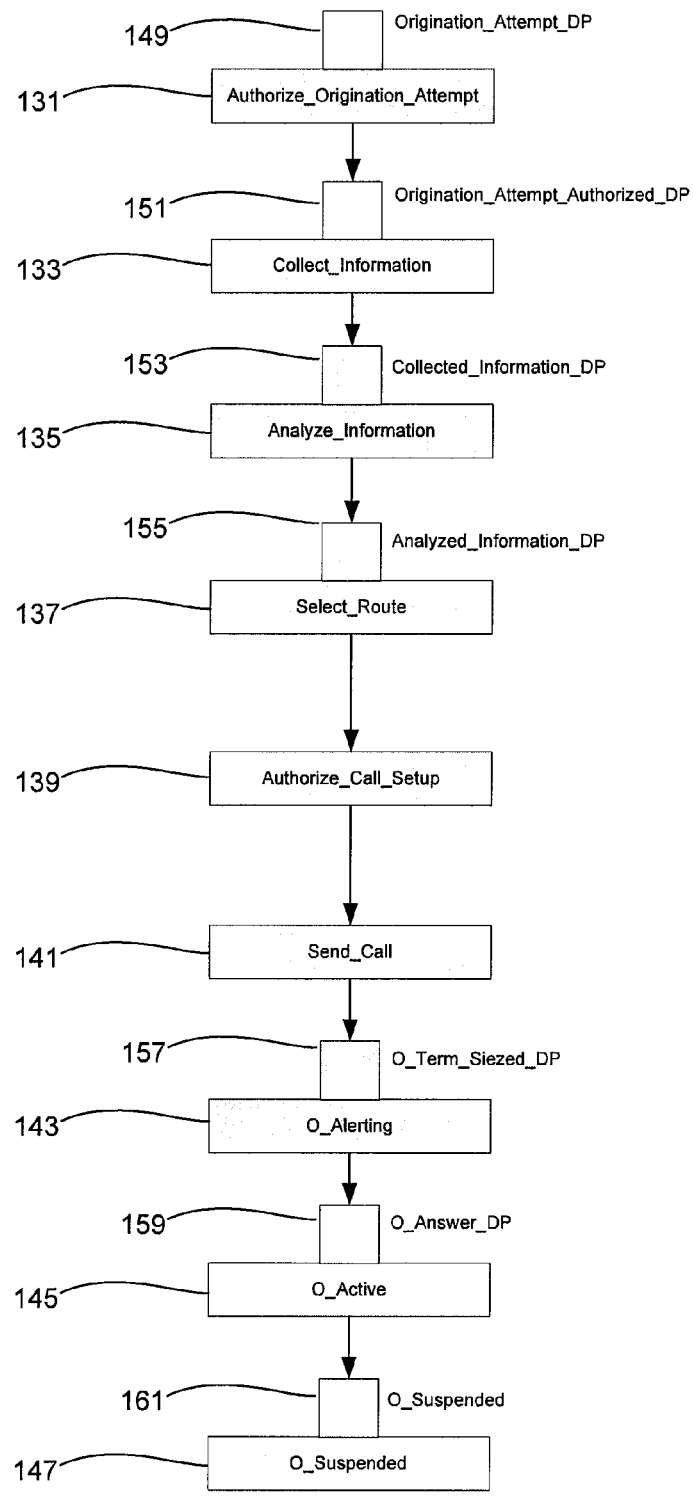
FIG. 3 illustrates a functional block diagram of an Originating Basic Call State Model.

WIN makes use of a Basic Call State Model (BCSM) which includes the following components: Points in Call (PIC), Points in Mobility Management (PIMM), Detection Points (DPs) and Trigger Detection Points (TDPs). The Basic Call State Model (BCSM) is a high-level model of the call processing activities within the MSC and is described in WIN Interim Standards IS-771, IS-826, and IS-848. WIN defines two BCSMs: an Originating Basic Call State Model (O-BCSM), and a Terminating Basic Call State Model (T-BCSM). An example of an O-BCSM is illustrated in FIG. 3. The O-BCSM defines the Points in Calls (PICs), Detection Points (DPs), and the transitions between various call states.

Such a model allows for consistent implementation of triggers among different vendors. A simplified version of the O-BCSM is illustrated in FIG. 3. In the O-BCSM, the following PICs are encountered during call processing:
1) Authorize_Origination_Attempt 131
2) Collect Information 133
3) Analyze_Information 135
4) Select Route 137
5) Authorize_Call_Setup 139
6) Send_Call 141
7) O_Alerting 143
8) O_Active 145
9) O_Suspended 147

A set of entry events define the transitional actions that occur entering the PIC. Exit events mark the completion of processing by the current PIC. The entry and exit events provide a manner of describing what constitutes being in a particular PIC. Within each PIC, the MSC software performs call processing for that stage of the call. The specific entry events, function, and exit events are provided by the WIN Interim Standards IS-771, IS-826, and IS-848.

The O-BCSM also defines Detection Points (DP) between the various PICs at which intelligent call processing can occur. At the DP, the MSC detects that the call has reached a particular state by having exited the previous PIC and encountering the DP. Intelligent processing can be invoked to communicate with the SCP to determine further information regarding the call or request instructions about how the call should be handled.

One type of DP is a trigger detection point (TDP). The TDP is an invocation point at which the SSP can set triggers that execute when the TDP is encountered. Typically, the triggers are provisioned at the SSP based on which call-processing events require intervention from the SCP. WIN defines the following TDPs:
1) Origination_Attempt_DP 149
2) Origination_Attempt_Authorized_DP 151
3) Collectedinformation_DP 153
4) Analyzed_Information_DP 155
5) O_Term_Seized DP 157
6) O_Answer_DP 159
7) O_Suspended_DP 161

It is possible for a single trigger or multiple triggers to be defined at each of the TDPs. When a trigger has been subscribed for a particular TDP and the TDP is encountered, the SSP launches a query to the SCP for further information about the call or to request instructions on how the call should be handled. A trigger is typically defined in terms of the TDP, DP criteria, category, interface, trigger type, fault handling, TIA/EIA-41 operation, and the arming mechanism. The TDP defines the detection point at which the defined trigger can be detected.

The DP criteria defines the conditions that are needed to trigger. The criteria may be conditional or unconditional. A conditional criteria is effective only when the trigger is active and the criteria is satisfied. An unconditional trigger is effective when the trigger is active.

The trigger category defines the level at which the trigger is subscribed. A trigger may be subscribed at different levels, ranging from an individual subscriber line to the entire SSP. Examples of the different levels for which a trigger can apply include individual line or trunk group, business group, or office wide. The trigger type defines the value that identifies the type of criteria that caused the network to detect a valid trigger condition at the defined TDP.

The fault handling defines the procedures for the case when the network does not respond to the particular trigger. The TIA/EIA-41 operation identifies the particular TIS/EIA-41 operation that is used the query WIN service logic, such as an SCP.

The arming mechanism identifies the possible mechanisms by which the trigger is armed. For example, subscriber triggers may be armed by parameters received by the MSC. Triggers may also be dynamically armed on a per call basis by parameters within call related operations. For office based triggers, the triggers may be armed in the provisioning process by a separate service management system.

One type of trigger that can be utilized in WIN is the Specific_Called_Party_Digit_String. The Specific_Called_Party_Digit_String is detected at the Analyzed_Information TDP and is a conditional trigger that is triggered when an appropriate sequence of digits is dialed according to a dialing plan that is in use. For example, a 3, 6, or 10 digit sequence of digits can be provisioned as the trigger. By using the functionality of the Specific_Called_Party_Digit_String, the MSC can screen calls to identify only those calls in which the appropriate sequence of digits have been dialed. The Specific_Called_Party_Digit_String is an office-based trigger and therefore the trigger will be applied to every call that is processed by the MSC. Additional details regarding the Specific_Called_Party_Digit_String is in the TIA/EIA/IS-826 standard, which is known to those of ordinary skill in the art.

During call processing, all attempted communications may be screened in specific MSC(s) and the Specific_Called_Party_Digit_String trigger can be used to only complete certain selected communications. Such communications may be, for example, communications attempted by emergency service personnel or communications attempted by the general public to emergency services agencies. The attempted communications may include a specific pre-identified sequence of digits that indicate to the network that the communication should be completed. If an attempted communication does not include a specific pre-identified sequence of digits, then attempted communication will not be completed.

The components and procedures described above may be used to implement a public safety communication incident response procedure in which all communication is shut down through a portion of the network 10 for all customers except for a selected category of customers. For example, during an emergency situation, it may be desirable to shut down communications on the network 10 for all mobile stations except for those communications attempted by emergency service personnel (such as E911, WPS, and public safety personnel) or those communications attempted by the general public to public safety entities (such as E911).

The decision to allow an attempted communication to be completed may be based on whether the appropriate sequence of digits is dialed by the user. For example, as known to those of skill in the art, the mobile stations of many emergency service personnel often subscribe to the WPS program. Mobile stations that subscribe to the WPS program are capable of dialing a predetermined sequence of digits to receive priority over other attempted communications on the network 10. One such sequence of digits employed by the WPS program is *272. During the emergency situation, the network 10 may allow all communications attempted by emergency service personnel by identifying that the mobile station 15 subscribes to the WPS program and by detecting that the emergency service personnel dialed the appropriate dialed the appropriate sequence of digits (i.e., *272). Alternatively, the network may allow attempted communications made to a public safety entity, such as 911, by detecting that the user dialed the appropriate sequence of digits (i.e., 911). It is also possible that the network may be configured to allow other categories of customers to be able to complete attempted communications during the emergency situation. The process is described more fully below.

Figure 4:
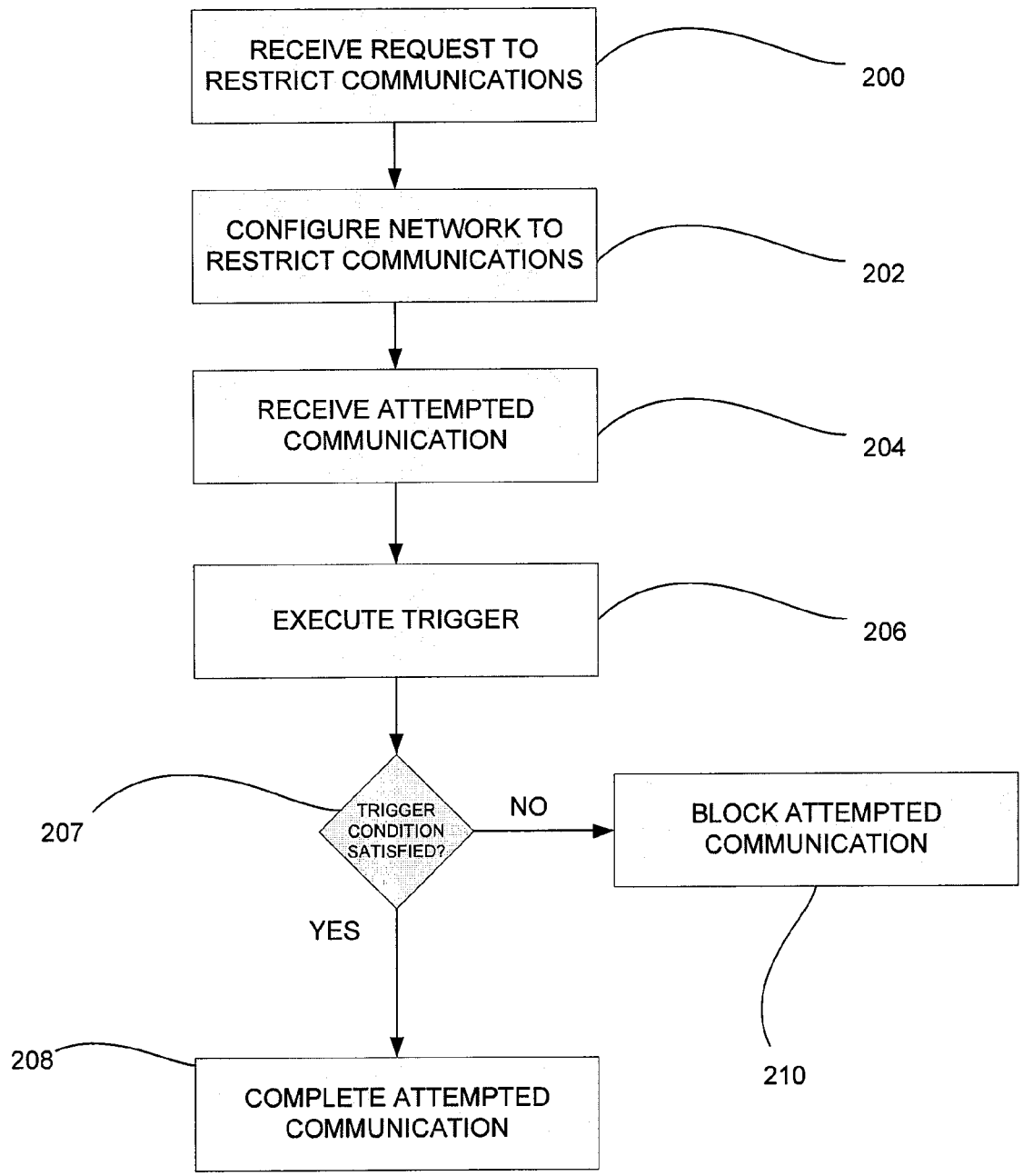
FIG. 4 illustrates a flowchart of one example of a public safety communication incident response procedure.

FIG. 4 illustrates a flowchart of one example of a public safety communication incident response procedure. During an emergency situation, as shown in step 200, the network operator may receive a request to restrict communication of mobile stations 15 in a particular geographic region except for a selected category of mobile stations 15. In response to the request, the network operator may configure the cell site base stations 113 and/or MSC 117, 119 located within that particular geographic region to restrict communication at step 202 for all but a selected category of mobile stations. It is contemplated that the cell site base stations 113 or MSC 117, 119 may be programmed to restrict communication through cell site base stations located in a particular geographical area. The selected category of mobile stations 15 may be, for example, mobile stations of emergency service personnel or mobile stations 15 attempting to communicate with a public safety entity. Although communication is restricted through the specified cell site base stations 113, it is contemplated that the specified cell site base stations 113 will continue wireless radio frequency communications.

In one example, communication may be restricted, but with a trigger having a trigger condition set to allow certain communications to go through the affected cells. One such trigger that may be used is the Specific_Called_Party_Digit_String trigger described above. When the Specific_Called_Party_Digit_String trigger is used, the trigger condition is detected when the appropriate sequence of digits is detected. The MSC 117 may be programmed to detect the appropriate sequence of digits and send a message to the SCP 125 to request instructions on whether the attempted communication should be allowed to go through the restricted portion of the network. Alternatively, the MSC 117 may be programmed to determine if the detected sequence of digits is appropriate.

If the trigger condition is detected, the attempted communication from the mobile station 15 is determined to be an emergency communication and is completed through the cell site base station 113. If the trigger condition is not satisfied, the attempted communication from the mobile station 15 is prohibited and should not be completed through the cell site base station 113. The trigger condition may be satisfied when the appropriate sequence of digits is detected. The appropriate sequence of digits may be, for example, a wireless priority service number or an emergency telephone number (e.g., 911) as dialed from a mobile station operating through one of the affected cells.

During operation, at step 204, the configured MSC 117 receives an attempted communication from a mobile station through a cell site base station 113. Upon receiving the attempted communication, at step 206, the trigger is executed and the MSC 117 determines whether the trigger condition is satisfied. If the trigger condition is satisfied the MSC 117 identifies the attempted communication as an emergency communication. If the communication is an emergency communication, at step 208, the attempted communication is completed through the appropriate cell site base station 113. Alternatively, upon execution of the trigger, the MSC 117 may query the SCP 125 for further instructions and completes the attempted communication through the appropriate cell site base station 113 if so instructed by the SCP 125 upon determination by the SCP 125 that the trigger condition is satisfied. If the trigger condition is not satisfied, the communication is determined to be a non-emergency communication and the attempted communication is blocked from being completed through the identified cell site base station 113, as shown in step 210. In this case, the attempted non-emergency communication may be dropped or an error message may be provided to the mobile station 15 that attempted the non-emergency communication.

As discussed above, when the Specific_Called_Party_Digit_String trigger is used, the trigger condition is satisfied when the appropriate sequence of digits is dialed, such as, for example, a wireless priority service number or an emergency telephone number (e.g., 911). When the Specific_Called_Party_Digit_String trigger is used, upon receiving the attempted communication, at step 206, the Specific_Called_Party_Digit_String trigger is executed and the MSC 117 detects whether the appropriate sequence of digits is present. If the appropriate sequence of digits is present, the trigger condition is satisfied and the MSC 117, 119 identifies the attempted communication as an emergency communication. If the appropriate sequence of digits is not present, the trigger condition is not satisfied and the MSC 117, 119 identifies the attempted communication as a non-emergency communication. If the communication is an emergency communication, at step 208, the attempted communication is completed through the identified cell site base station 113. If the communication is a non-emergency communication, at step 212, the attempted communication is blocked from being completed through the identified cell site base station 113.

The method described above allows the network operator to shut down communications in a limited geographical area while still allowing emergency service personnel, such as E911 personnel, Wireless Priority Service ("WPS") personnel, or public safety personnel, in the affected geographical area to communicate on the wireless mobile communication network. For example, emergency service personnel may attempt a communication using a WPS enabled mobile station by dialing the appropriate sequence of digits necessary for a WPS call (e.g., *272). The MSC 117 identifies the mobile station 15 as being WPS enabled and detects the sequence of digits dialed by the mobile stations. Based on the identification of the WPS enabled phone and the appropriate sequence of digits, the network completes the attempted communication. In other example, a user may attempt a communication to a public service agency, such as E911. When the customer dials 911 on the mobile station, the MSC 117 detects the appropriate sequence of digits (i.e., 911) and completes the attempted communication to the desired destination. It is understood that the network may be configured to allow other categories of customers to be able to complete an attempted communication by dialing an appropriate sequence of digits.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:
1. A method, comprising steps of:
in response to an emergency in a region, configuring an originating mobile switching center switch of a mobile communication network to selectively permit, during the emergency, emergency communications originating from mobile stations in the region through a transceiver of a plurality of transceivers that serve a cell site controlled by the originating mobile switching center switch;

identifying a transceiver from among the plurality of transceivers that sent the detected appropriate sequence of destination digits received by the originating mobile switching center switch;

based on the originating mobile switching center switch configuration, implementing an origination trigger for the originating mobile switching center switch, wherein the origination trigger designates a Specific_Called_Party_Digit_String trigger condition based on a sequence of destination digits for attempted communications through the identified transceiver;

while the originating mobile switching center switch is configured for the emergency, in response to an attempted communication through the identified transceiver originating from a mobile station of a user other than emergency service personnel, detecting within the originating mobile switching center switch receipt of an appropriate sequence of destination digits from the mobile station that satisfies the Specific_Called_Party_Digit_String trigger condition;

based on the detected appropriate sequence of destination digits of the Specific_Called_Party_Digit_String trigger condition sent by the identified transceiver, responsive to the detected designated trigger condition, querying a service control point coupled to the switch for instructions with respect to the attempted communication through the identified transceiver originating from the mobile station;

receiving instructions from the service control point in response to the querying, indicating that the detected designated trigger condition is satisfied based upon a determination that the attempted communication is an emergency communication;

responsive to the instructions received from the service control point, completing by the originating mobile switching center switch the attempted communication through the identified transceiver originating from the mobile station based on the determination that the attempted communication is an emergency communication directed to a public safety entity; and while the switch is configured for the emergency, blocking all originating communication attempts for non-emergency communications from other mobile stations through the identified cell site base station for which the designated trigger condition is not detected.

2. The method of claim 1, wherein the appropriate sequence of destination digits satisfies the Specific_Called_Party_Digit_String trigger condition for the attempted communication through the identified transceiver originating from the mobile station includes a predetermined sequence of digits for use by emergency service personnel.

3. The method of claim 1, wherein the attempted communication is determined to be an emergency communication when the attempted communication originates from a selected category of mobile stations associated with emergency service personnel and an appropriate sequence of the predefined sequence of digits detected by the switch with respect to the attempted communication.

4. The method of claim 1, wherein a first predefined sequence of digits received as the predefined sequence of digits allows attempted communications from mobile stations of emergency service personnel and a second sequence of digits allow attempted communications from mobile stations of non-emergency service personnel to be completed, the first sequence of digits including digits for non-emergency communications and the second sequence of digits including digits designated exclusively for emergency communications.

5. The method of claim 1, further comprising:
in response to an attempted non-emergency communication from the mobile station through the identified transceiver, blocking the attempted non-emergency communication; and providing an error message to the mobile station from which the attempted non-emergency communication originated.

6. The method of claim 1, wherein the mobile communication network is a wireless intelligent network, and the detected designated trigger condition is based on a trigger implemented in the switch to cause the switch to query the service control point of the wireless intelligent network for processing attempted communications from mobile stations through the identified transceiver.

7. The method of claim 1, wherein prior to the detecting within the originating mobile switching center switch, the method further comprises:
receiving at an Analyzed Information trigger detection point while processing the attempted communication the appropriate sequence of destination digits that initiates execution of the Specific_Called_Party_Digit_String trigger condition.

8. The method of claim 7, wherein the Specific_Called_Party_Digit_String is a conditional trigger that is triggered according to a dialing plan that is in use.

9. The method of claim 7, wherein the Specific_Called_Party_Digit_String is a conditional trigger that is effective only when conditional criteria of the trigger condition is satisfied and the trigger is active.

10. The system of claim 1, wherein the mobile switching center switch is further configured to:
prior to the detecting within the originating mobile switching center switch, receive at an Analyzed Information trigger detection point while processing the attempted communication, the appropriate sequence of destination digits that initiates execution of the Specific_Called_Party_Digit_String trigger condition.

11. The system of claim 10, wherein the Specific_Called_Party_Digit_String trigger condition is a conditional trigger that is triggered according to a dialing plan that is in use.

12. The system of claim 10, wherein the Specific_Called_Party_Digit_String is a conditional trigger that is effective only when conditional criteria of the trigger condition is satisfied and the trigger is active.

13. A system comprising:
an originating mobile switching center switch connected through trunk circuits to a plurality of transceivers, wherein the plurality of transceivers are controlled by the originating mobile switching center switch; and a service control point coupled to the originating mobile switching center switch, wherein the service control point is configured to determine whether a designated origination trigger condition is satisfied for the originating mobile switching center switch, wherein the originating mobile switching center switch is configured to selectively permit communications originating from mobile stations in a region through a transceiver of the plurality of transceivers controlled by the originating mobile switching center switch during an emergency in the region, wherein during the emergency the originating mobile switching center switch is further configured to:

identify a transceiver from among the plurality of transceivers that sent the detected appropriate sequence of destination digits received by the originating mobile switching center switch;

based on the originating mobile switching center switch configuration, implement an origination trigger for the originating mobile switching center switch, wherein the origination trigger designates a Specific_Called_Party_Digit_String trigger condition based on a sequence of destination digits for attempted communications through the identified transceiver;

in response to an attempted communication through the identified transceiver originating from a mobile station of a user other than emergency service personnel, detect, within the originating mobile switching center switch, receipt of an appropriate sequence of destination digits from the mobile station that satisfies the Specific_Called_Party_Digit_String trigger condition;

based on the detected appropriate sequence of destination digits of the Specific_Called_Party_Digit_String trigger condition sent by the identified transceiver, querying by the originating mobile switching center switch the service control point for instructions with respect to the attempted communication through the identified transceiver originating from the mobile station that the attempted communication is an emergency communication directed to a public safety entity from a mobile station other than an emergency service personnel mobile station;

receive instructions from the service control point in response to the querying, indicating that the detected designated trigger condition is satisfied based upon a determination that the attempted communication is an emergency communication; and complete by the originating mobile switching center switch the attempted communication through the identified transceiver originating from the mobile station, based on the identification of the emergency communication by the mobile switching center switch; and block all communication attempts for non-emergency communications originating from other mobile stations through the identified cell site base station for which the designated trigger condition is not detected.

14. The system of claim 13, wherein the designated trigger condition is detected when the appropriate sequence of digits include destination digits for the attempted communication through the identified transceiver originating from the mobile station includes a predetermined sequence of digits for use by emergency service personnel.

* * * * *